US005595829A

United States Patent [19]

Pitts et al.

[11] Patent Number: 5,595,829

[45] Date of Patent: Jan. 21, 1997

[54] POSTERBOARD

[76] Inventors: Barbara R. Pitts, 3100 Bullock, Plano, Tex. 75023; Mary R. Sarao, 11342 Straight La., Dallas, Tex. 75229

[21] Appl. No.: 501,385

[22] Filed: Jul. 12, 1995

[51] Int. Cl.[6] .......................... B32B 9/00

[52] U.S. Cl. .......................... 428/537.5; 428/153; 428/155; 428/172; 428/321.1; 283/62; 283/115; 283/117; 40/595; 33/477

[58] Field of Search .......................... 428/153, 155, 428/537.5, 172; 283/62, 115, 117; 40/595; 33/477

[56] References Cited

U.S. PATENT DOCUMENTS 5,045,378 9/1991 Libby .......................... 428/153

*Primary Examiner*—Patrick Ryan

*Assistant Examiner*—Abraham Bahta

*Attorney, Agent, or Firm*—Guy V. Manning

[57] ABSTRACT

Improved posterboard is formed from a rectangular posterboard having vertical side edges and horizontal top and bottom edges. Guide marking are applied to the posterboard. The guide markings are visually perceptible at a writing distance away from the posterboard, and substantially imperceptible at a viewing distance length away from the posterboard.

19 Claims, 1 Drawing Sheet

POSTERBOARD

FIELD OF THE INVENTION

This invention relates to an improved posterboard which may be used to create posters, signs, and other displays of visual material.

BACKGROUND ART

Posterboard is a standardized product that is used to create all types of hand-lettered and hand-drawn signs and displays, such as posters. A problem in the use of conventional posterboard is that evenly-spaced letters, and evenly-spaced lines, are virtually impossible to achieve without pre-measuring and pre-marking the posterboard with guide markings. Typically, a user will pre-mark and pre-measure a posterboard with faint pencil lines to enable even lettering and line spacing, and then the pencil lines are erased upon finishing the project. The use of pencil lines for guide markings suffers from a number of substantial drawbacks. The application of pencil lines is time consuming and requires a reasonable amount of precision not available to school children or casual users without drafting equipment. The subsequent erasure of pencil lines is often incomplete and impossible to complete so that there is no visible trace. Erasure of pencil lines often smears the lettering or drawing that has been applied. The use of pencil lines requires a high degree of pre-planning and therefore limits creativity in arrangement as the project progresses.

A number of complicated pre-marking devices are known in the art. These devices are difficult to use as well as expensive to acquire.

In addition, U.S. Pat. No. 5,045,378 to Libby discloses paperboard sheets wherein a grid is permanently deformed into the sheet. Libby requires specialized apparatus for scribing the sheets, and is therefore not suited to production in an economical fashion by conventional and readily available printing equipment. In addition, the permanently deformed or embossed guide marking of Libby interferes with many types of drawing and lettering media, such as pencil and crayons, producing unpredictable visual results.

SUMMARY OF THE INVENTION

The present invention is an improved posterboard having guide marking applied by an ordinary offset printing process. The guide markings are visually perceptible at a writing distance away from the posterboard, but are visually imperceptible at a viewing distance away from the posterboard.

BRIEF DESCRIPTION OF THE DRAWINGS

A more complete understanding of the invention and its advantages will be apparent from the Detailed Description taken in conjunction with the accompanying Drawing in which.

DETAILED DESCRIPTION

Figure 1:
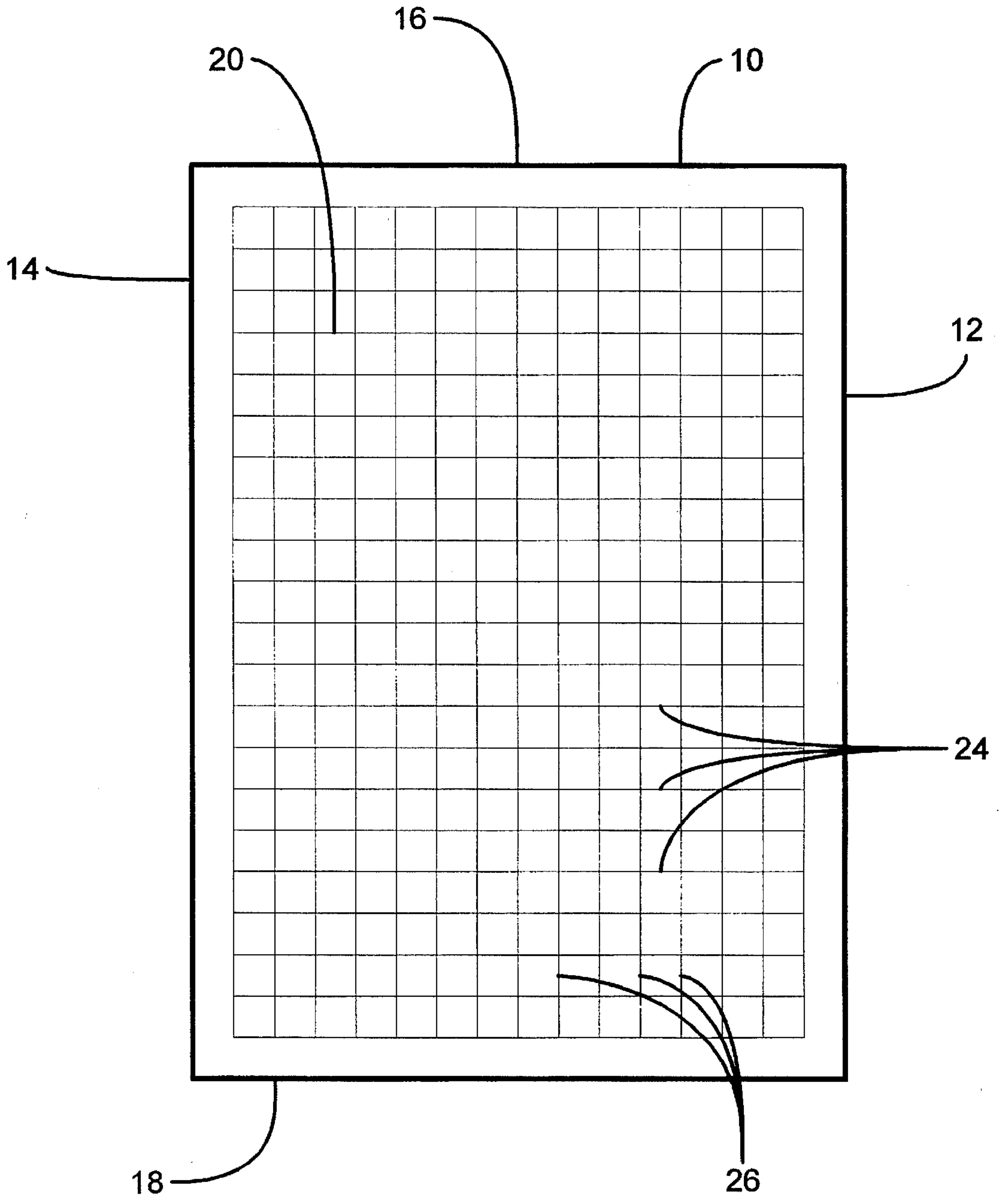
FIG. 1 illustrates a front view of posterboard incorporating the invention.

Referring to FIG. 1, posterboard 10 is rectangular in shape, having vertical side edges 12 and 14, and horizontal top edge 16, horizontal bottom edge 18. Guide markings 20 are applied to the posterboard over substantially all of the area within the side edges 12 and 14, top edge 16 and bottom edge 18. In the preferred embodiment, side markings 20 are composed of a grid 22 printed on posterboard 10. The grid

22 is composed of horizontal lines 24 and vertical lines 26. It will be apparent to those skilled in the art that guide markings other than a grid, such as simple horizontal lines, may also be used to achieve substantially the same results as in the preferred embodiment.

The essential feature of the invention is that the guide markings are visually perceptible at a writing distance away from the posterboard, but are substantially imperceptible at a viewing distance away from the posterboard. In other words, the guide markings are visible to the person lettering or drawing the posterboard, but invisible to subsequent viewers of the posterboard that are a reasonable distance away, such as at least an arm's length away. The desired function is the provision of faintly visible guide lines during creation of the display that "disappear" from view except under close and careful scrutiny. The casual viewer more than an arm's length away from the posterboard cannot see the guide markings. The distance at which the markings become imperceptible is about 24 to 36 inches.

An example of the preferred embodiment of the invention has been prepared from posterboard made by Greenhill and known as TAG board. The guide markings are applied to substantially all of one surface of the posterboard by an ordinary offset printing process. The guide markings are composed of a grid having horizontal and vertical lines of substantially equal thickness and substantially equal spacing. The lines are one point rule weight (1/72 inch) thick, and the lines are 0.5 inch apart both horizontally and vertically.

The "disappearing" guide markings effect is achieved by preparing the printing plate by exposure behind a 10% screen. Thus, only 10% of the exposure is applied to the plate that would normally be applied to achieve solid lines. Then, the posterboards are printed with a specially formulated color of ink. In the example, the ink is composed of a 50/50 mixture of PMS silver (Pantone 877) and opaque white. This color of ink, printed with the 10% exposed plate, results in the desired visual character of the guide marking grid.

Whereas, the present invention has been described with the respect to a specific embodiment thereof, it will be understood that various changes and modifications will be suggested to one skilled in the art, and it is intended to encompass such changes and modifications as fall within the scope of the appended claims.

We claim:

1. An improved posterboard, comprising:

a rectangular posterboard having vertical side edges and horizontal top and bottom edges;

guide markings printed on the posterboard;

the guide markings being visually perceptible at a writing distance away from the posterboard, and substantially imperceptible at a viewing distance away from the posterboard.

2. The posterboard of claim 1 with the guide markings being a grid of horizontal and vertical lines.

3. The posterboard of claim 2 with the grid composed of horizontal and vertical lines of substantially equal thickness.

4. The posterboard of claim 2 with the grid composed of horizontal and vertical lines of substantially equal spacing.

5. The posterboard of claim 2 with the grid composed of horizontal and vertical lines of substantially equal thickness and spacing.

6. The posterboard of claim 3 with the lines being about one point rule weight thick.

7. The posterboard of claim 4 with the lines being spaced about 0.5" apart.

8. The posterboard of claim 5 with the lines being about one point rule weight thick and being spaced about 0.5 inch apart.

9. The posterboard of claim 1 with the guide markings being printed from an ink composed of about 50% silver and 50% white.

10. The posterboard of claim 1 with the guide markings being printed by a plate exposed with a 10% screen.

11. The posterboard of claim 2 with the grid being printed from an ink composed of about 50% silver and 50% white.

12. The posterboard of claim 2 with the grid being printed by a plate exposed with a 10% screen.

13. An improved posterboard, comprising:

a rectangular posterboard having vertical side edges and horizontal top and bottom edges;

guide markings applied to substantially all of one surface of the posterboard;

the guide markings composed of a grid printed on the posterboard;

the grid composed of horizontal and vertical lines of substantially equal thickness and substantially equal spacing;

the lines being about one point rule weight thick;

the lines being spaced about 0.5" apart;

the lines being visually perceptible at a writing distance away from the posterboard, and substantially imperceptible at a viewing distance away from the posterboard;

the lines being printed from an ink composed of about 50% silver and 50% white; and the grid printed by a plate exposed with a 10% screen.

14. An improved posterboard comprising a writing surface having top, bottom and side edges;

guide markings printed on the writing surface using an ink composed of 50% silver and 50% white pigments;

whereby the guide markings are visually perceptible at a writing distance away from the writing surface and substantially imperceptible at a viewing distance away from the writing surface greater than the writing distance.

15. The improved poster board of claim 14 wherein the guide markings are printed using a plate exposed with a 10% screen.

16. The improved poster board of claim 14 wherein the guide markings are applied in a grid composed of intersecting horizontal and vertical lines.

17. An improved posterboard comprising a writing surface having top, bottom and side edges;

guide markings printed on the writing surface using a plate exposed with a 10% screen;

whereby the guide markings are visually perceptible at a writing distance away from the writing surface and substantially imperceptible at a viewing distance away from the writing surface greater than the writing distance.

18. The improved posterboard of claim 17 wherein the guide markings are printed using an ink composed of 50% silver and 50% white pigments.

19. The improved posterboard of claim 17 wherein the guide markings are applied in a grid composed of intersecting horizontal and vertical lines.

* * * * *